(12) United States Patent
Chang et al.

(10) Patent No.: US 7,180,641 B2
(45) Date of Patent: Feb. 20, 2007

(54) COMBINATION OF AN OPTICAL MODULE AND A TRANSMITTING AND CARRYING STRUCTURE

(75) Inventors: Martin Chang, Hsin Chu (TW); Ching-Jung Tu, Hsin Chu (TW); Li-Fen Heu, Hsin Chu (TW)

(73) Assignee: Avision Inc., Hsinchu (TW)

( * ) Notice: Subject to any disclaimer, the term of this patent is extended or adjusted under 35 U.S.C. 154(b) by 798 days.

(21) Appl. No.: 10/287,418

(22) Filed: Nov. 4, 2002

(65) Prior Publication Data

US 2004/0051916 A1 Mar. 18, 2004

(30) Foreign Application Priority Data

Sep. 16, 2002 (TW) .............................. 91214550 U

(51) Int. Cl.
*H04N 1/04* (2006.01)
(52) U.S. Cl. ...................... 358/497; 358/474; 358/482; 358/483
(58) Field of Classification Search ................ 358/497, 358/494, 471–474, 483, 482, 505, 512–514; 382/312, 313, 318, 319; 399/211, 212; 250/208.2, 250/234–236, 216, 208.1, 239; 235/454
See application file for complete search history.

(56) References Cited

U.S. PATENT DOCUMENTS

| 6,147,780 A | * | 11/2000 | Chiang | ....................... 358/497 |
| 6,178,012 B1 | * | 1/2001 | Larkin et al. | ............... 358/474 |
| 6,330,084 B1 | * | 12/2001 | Chiang | ....................... 358/497 |

* cited by examiner

*Primary Examiner*—Cheukfan Lee

(57) ABSTRACT

A combination of an optical module and a transmitting and carrying structure includes an optical module, at least one carrying seat, and two rollers. The at least one carrying seat is combined with the optical module, for mounting the two rollers. The two rollers are located at the two opposite sides of the optical module. The two opposite sides of the optical module are perpendicular to the movement direction of the optical module. Thus, the at least one carrying seat and the two rollers are used to support and transmit the optical module, so that the optical module may be well balanced. In addition, the assembly height and the cost of fabrication are reduced.

11 Claims, 7 Drawing Sheets

COMBINATION OF AN OPTICAL MODULE AND A TRANSMITTING AND CARRYING STRUCTURE

BACKGROUND OF THE INVENTION

1. Field of the Invention

The present invention relates to an optical module of an image scanning device, and in particular to an optical module combined with a transmitting and carrying structure.

2. Description of the Related Art

In a scanner using a CIS optical module, the optical module is moved along the bottom face of the glass window to scan the document placed on the top face of the glass window of the scanner. Thus, the optical module needs to cooperate with a transmitting and carrying structure.

The transmitting and carrying structure of an optical module includes a slotted seat, at least one spring, and a shaft. The optical module and the spring are mounted in the slotted seat, and the spring is used to push the optical module toward the glass window. The shaft is fixed in the scanner and is passed through the slotted seat. The slotted seat can be moved along the shaft.

A single shaft may be used to support the optical module. Since the shaft is located under the optical module, the scanner may have a greater height and does not satisfy the light and thin requirements. If the single shaft is mounted to a side of the optical module, the optical module cannot be well balanced, and the obtained image quality is worse.

Alternatively, two shafts may be used to support the optical module, so that the optical module may be well balanced. However, the fabrication cost is increased. In addition, it is difficult to control the two shafts to be parallel with each other.

SUMMARY OF THE INVENTION

The primary objective of the invention is to provide a combination of an optical module and a transmitting and carrying structure, wherein the optical module may be well balanced.

Another objective of the invention is to provide a combination of an optical module and a transmitting and carrying structure, wherein the height of the optical module may be reduced.

A further objective of the invention is to provide a combination of an optical module and a transmitting and carrying structure, wherein the fabrication cost of the optical module may be reduced.

According to the above-mentioned objectives, the invention provides an optical module combined with at least one carrying seat and two rollers. Thus, the optical module may be well balanced, the assembly height of the optical module may be reduced, and the fabrication cost of the optical module may be reduced.

Further benefits and advantages of the invention will become apparent after a careful reading of the detailed description with appropriate reference to the accompanying drawings.

DETAILED DESCRIPTION OF THE INVENTION

Figure 1:
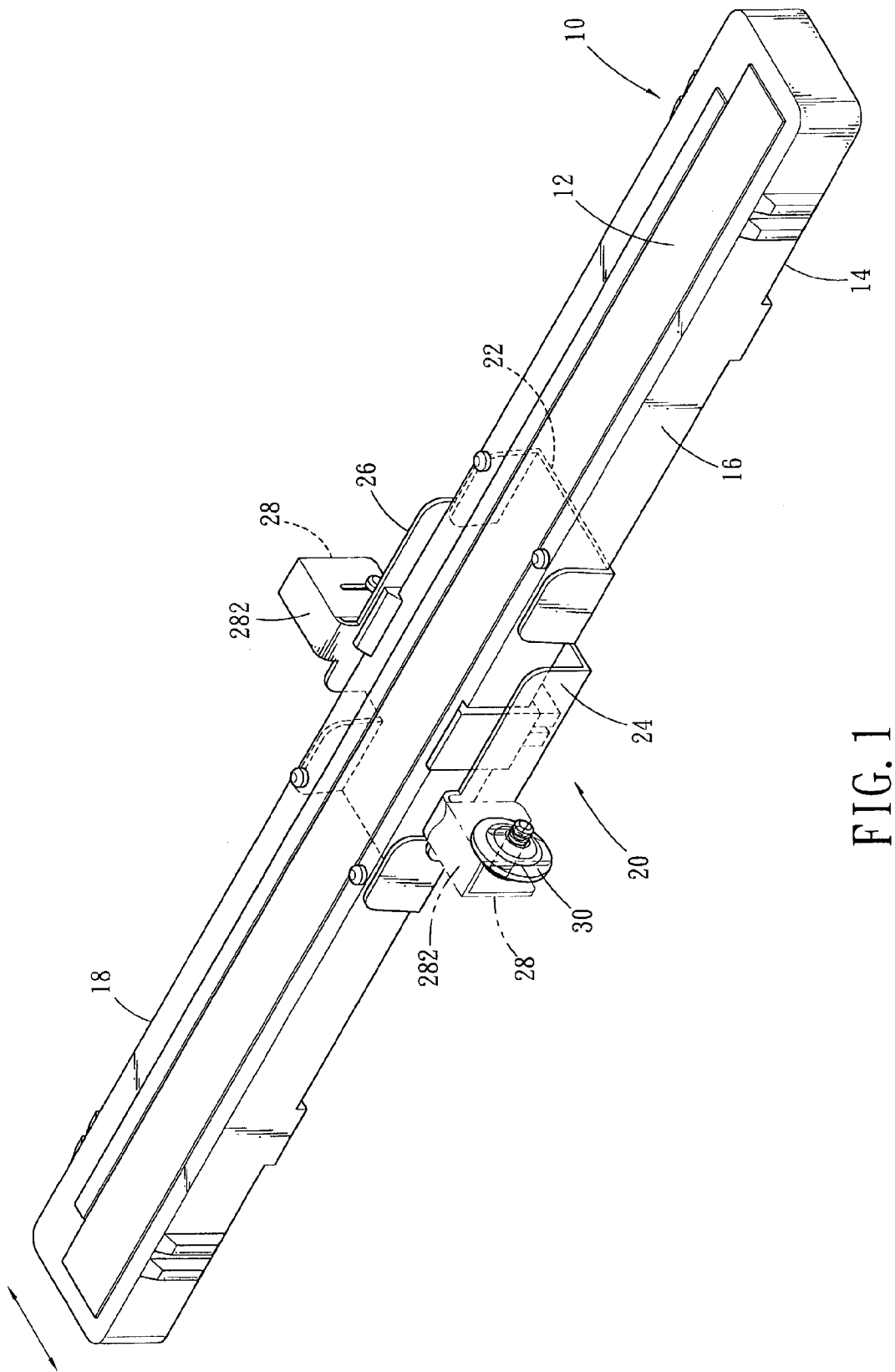
FIG. 1 is a pictorial view showing a combination of an optical module and a transmitting and carrying structure according to an embodiment of the invention.

Referring to FIG. 1, an optical module 10 having an elongated structure includes a scanning face 12 and a bottom face 14 opposite to the scanning face 12. Documents may be scanned on the scanning face 12.

The optical module 10 has a longitudinal direction perpendicular to the movement direction of the optical module 10. The optical module 10 has a first side 16 and an opposite second side 18 each directed to the longitudinal direction and each perpendicular to the movement direction of the optical module 10.

The optical module 10 also includes a carrying seat 20. The carrying seat 20 has a middle portion formed with a receiving recess 22. The receiving recess 22 has two opposite sides each formed with a wall 24 and a wall 26. Each wall 24 and 26 is provided with a roller seat 28.

Figure 2:
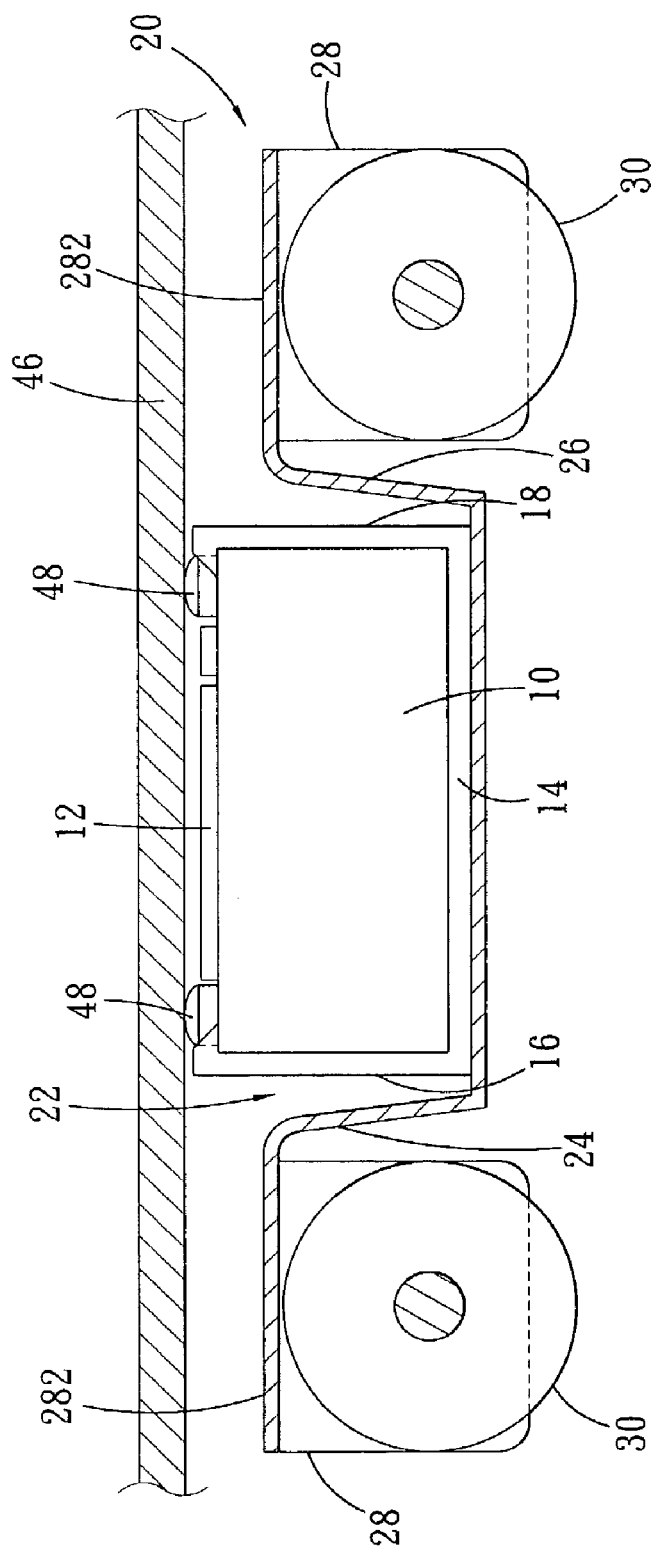
FIG. 2 is a cross-sectional view showing the combination of an optical module and a transmitting and carrying structure as shown in FIG. 1.

As shown in FIG. 2, the optical module 10 is mounted in the receiving recess 22 of the middle portion of the carrying seat 20. The walls 24 and 26 of the carrying seat 20 are opposite to the first side 16 and the second side 18 of the optical module 10 respectively. Thus, each roller seat 28 is located adjacent to the first side 16 and the second side 18 of the optical module 10 respectively.

It is appreciated that, after the carrying seat 20 is combined with the optical module 10, the top face 282 of each roller seat 28 is located between the scanning face 12 and the bottom face 14 of the optical module 10.

As shown in FIGS. 1 and 2, the roller 30 is mounted to the roller seat 28. Thus, the rollers 30 can roll along the movement direction of the optical module 10.

Figure 3:
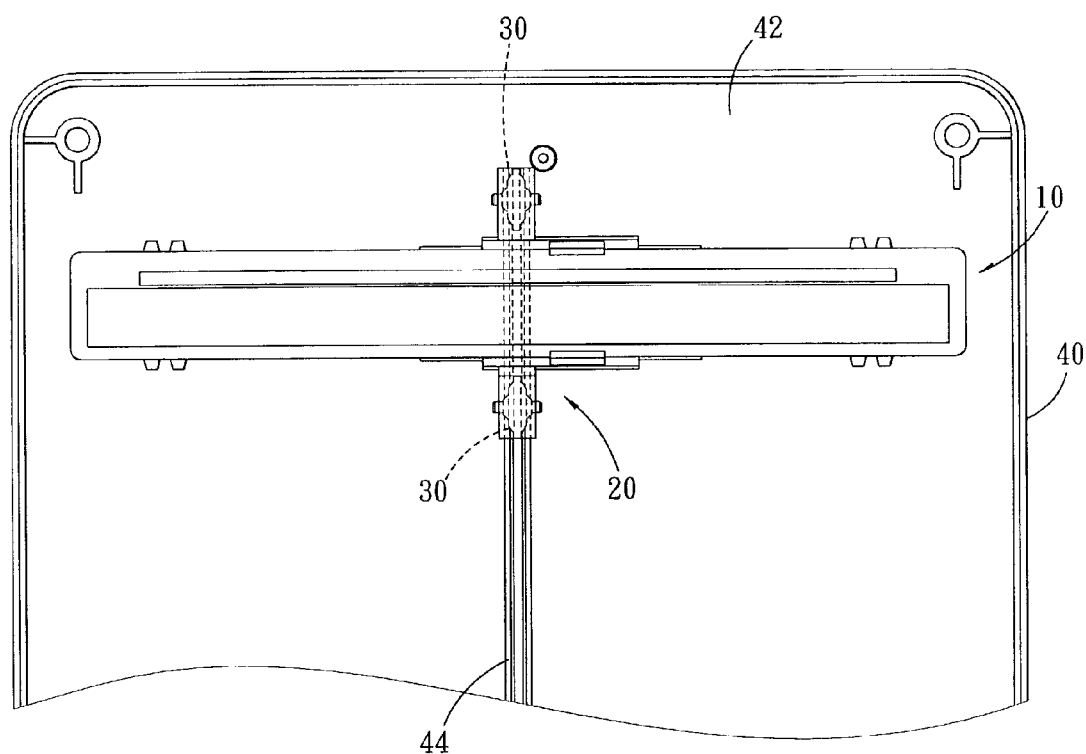
FIG. 3 is a partial plan view showing the combination of an optical module and a transmitting and carrying structure according to the embodiment of the invention.

As shown in FIG. 3, the combination of the optical module 10, the carrying seat 20 and the rollers 30 are mounted in a housing 40. The bottom face 42 of the housing 40 is provided with a track 44. The two rollers 30 are mounted in the track 44. The direction of the track 44 is the movement direction of the optical module 10.

As shown in FIG. 2, after the optical module 10 is positioned at a predetermined position, the scanning face 12 of the optical module 10 is opposite to the glass window 46. The scanning face 12 of the optical module 10 is provided with sliding members 48 having a smaller friction coefficient to facilitate smooth movement of the optical module 10. The sliding member 48 is preferably made of Teflon.

After the optical module 10 is positioned at the predetermined position, the glass window 46 exerts a downward pressing force against the optical module 10. The downward pressing force against the optical module 10 is supported by the carrying seat 20 and the two rollers 30. In addition, the carrying seat 20 pushes the optical module 10 toward the glass window 46 by its elastic force.

Accordingly, the optical module 10 is mounted in the receiving recess 22 of the middle portion of the carrying seat 20, thereby providing an excellent support effect to the optical module 10. Thus, the optical module 10 may be well balanced after being assembled.

The two rollers 30 are located at the first side 16 and the second side 18 of the optical module 10, respectively. Thus, the assembly height of the optical module 10 and the two rollers 30 is slightly greater than that of the optical module 10. Thus, when the assembly of the optical module 10 and the two rollers 30 is mounted in the scanner, the height of the scanner may be reduced.

In addition, the carrying seat 20 may be made of a metallic plate or a resilient plate. Each of the rollers 30 may be a commonly used member. Thus, the material has a lower price and the fabrication cost may be reduced.

Figure 4:
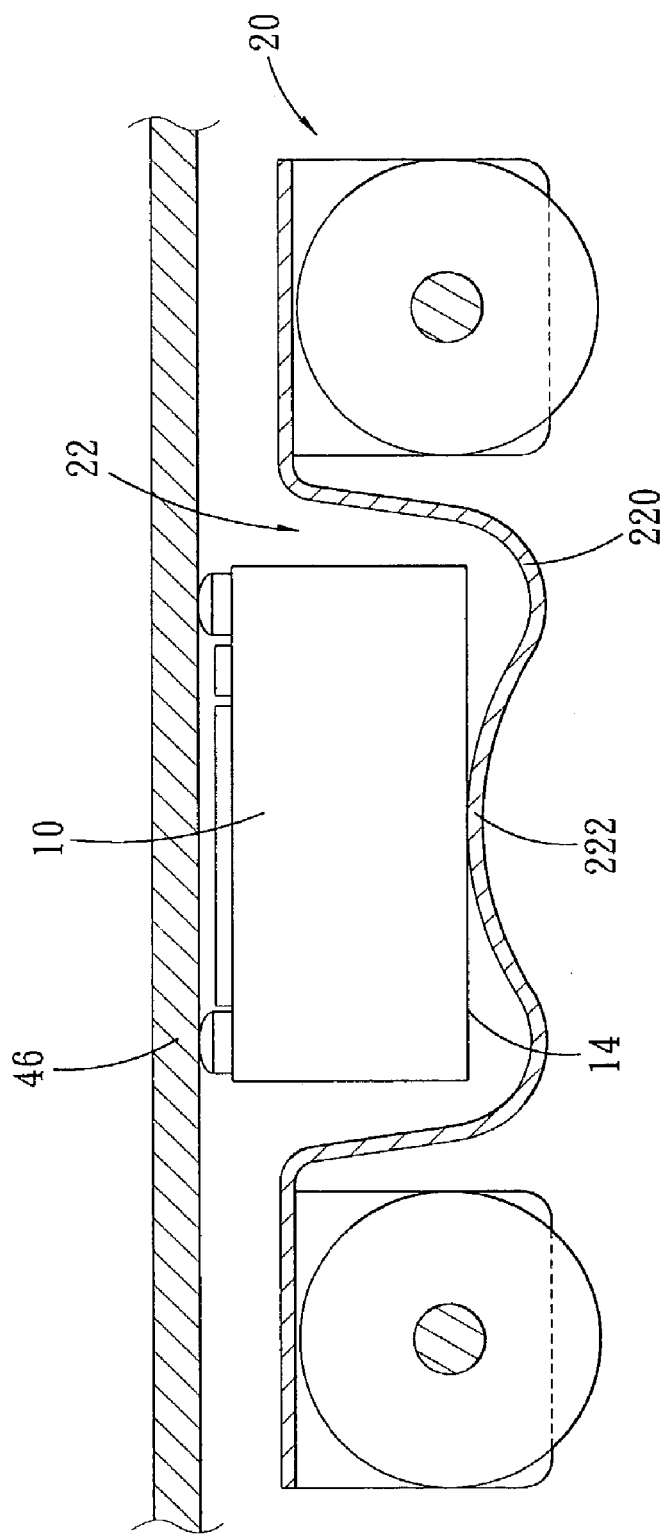
FIG. 4 is a schematically cross-sectional view showing the carrying seat according to another embodiment of the invention.

As shown in FIG. 4, the bottom face 220 of the receiving recess 22 of the carrying seat 20 is formed with a protrusion 222. When the carrying seat 20 is assembled with the optical module 10, the protrusion 222 of the carrying seat 20 is rested on the bottom face 14 of the optical module 10. Thus, the elastic deformation of the protrusion 222 of the carrying seat 20 absorbs the downward displacement of the optical module 10 pressed by the glass window 46. Then, the optical module 10 is rested on the glass window 46 smoothly, and may be moved along the glass window 46.

Figure 5:
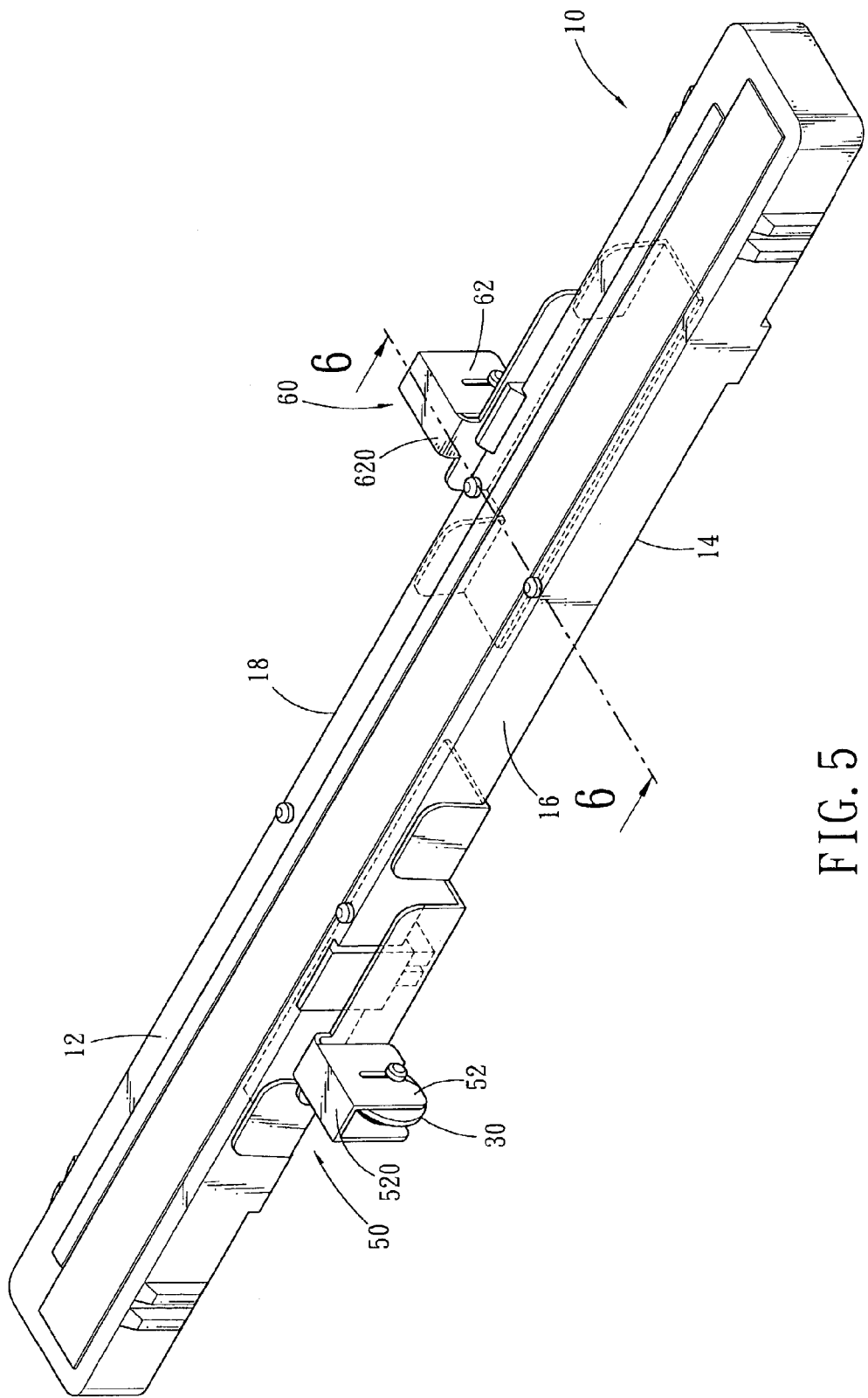
FIG. 5 is a pictorial view showing a combination of an optical module and a transmitting and carrying structure according to another embodiment of the invention.
Figure 6:
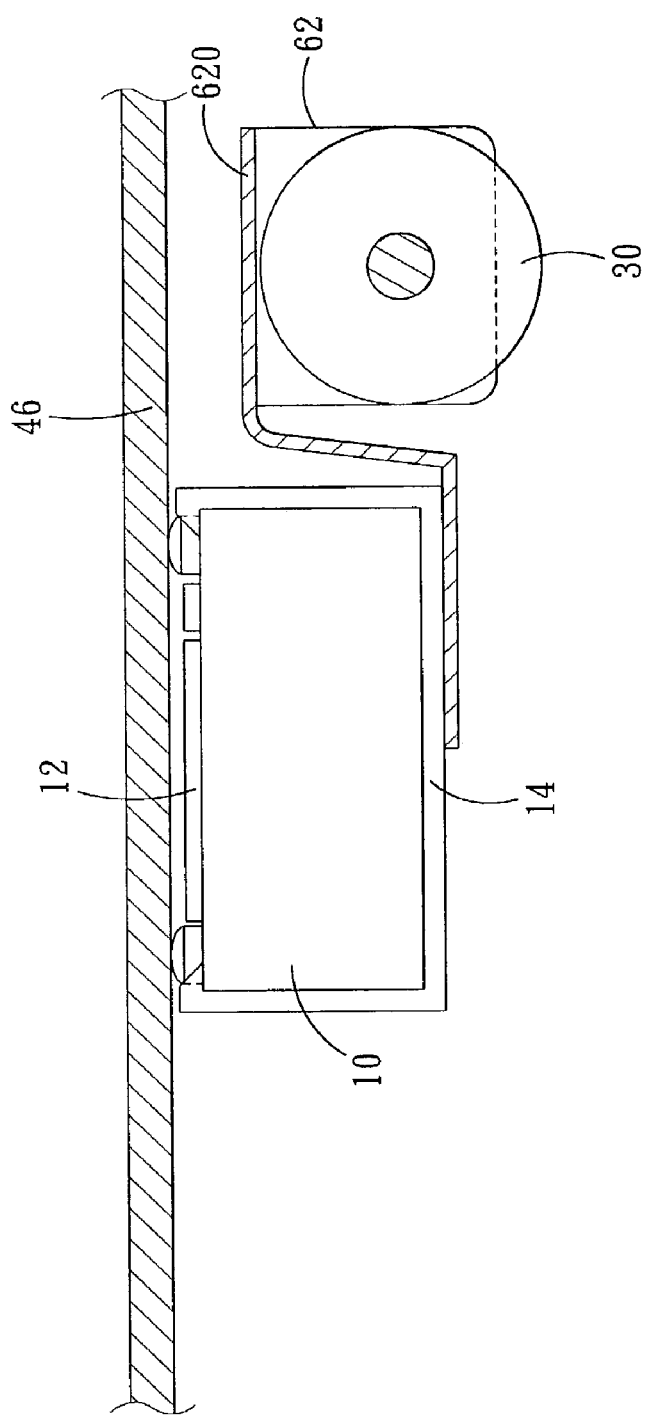
FIG. 6 is a cross-sectional view showing the combination of an optical module and a transmitting and carrying structure taken along line 6—6 as shown in FIG. 5.

As shown in FIGS. 5 and 6, the bottom face 14 of the optical module 10 is provided with two carrying seats 50 and 60. Each of the two carrying seats 50 and 60 has a roller seat 52 and a roller seat 62. The roller seat 52 is positioned at the first side 16 of the optical module 10, and the roller seat 62 positioned at the second side 18 of the optical module 10. The top faces 520 and 620 of the roller seats 52 and 62 are located between the scanning face 12 and the bottom face 14 of the optical module 10, respectively. The two rollers 30 are mounted to the roller seats 52 and 62 respectively.

It is appreciated that, the two carrying seats 50 and 60 are arranged in a staggered manner. That is, the two carrying seats 50 and 60 are not at the same line parallel to the movement direction of the optical module. Further, a topmost location of each roller 30 is located between the scanning face 12 and the bottommost face of the carrying seat 20. Thus, the two rollers 30 mounted to the two carrying seats 50 and 60 may provide larger support ability, so that the optical module 10 may be well balanced.

Figure 7:
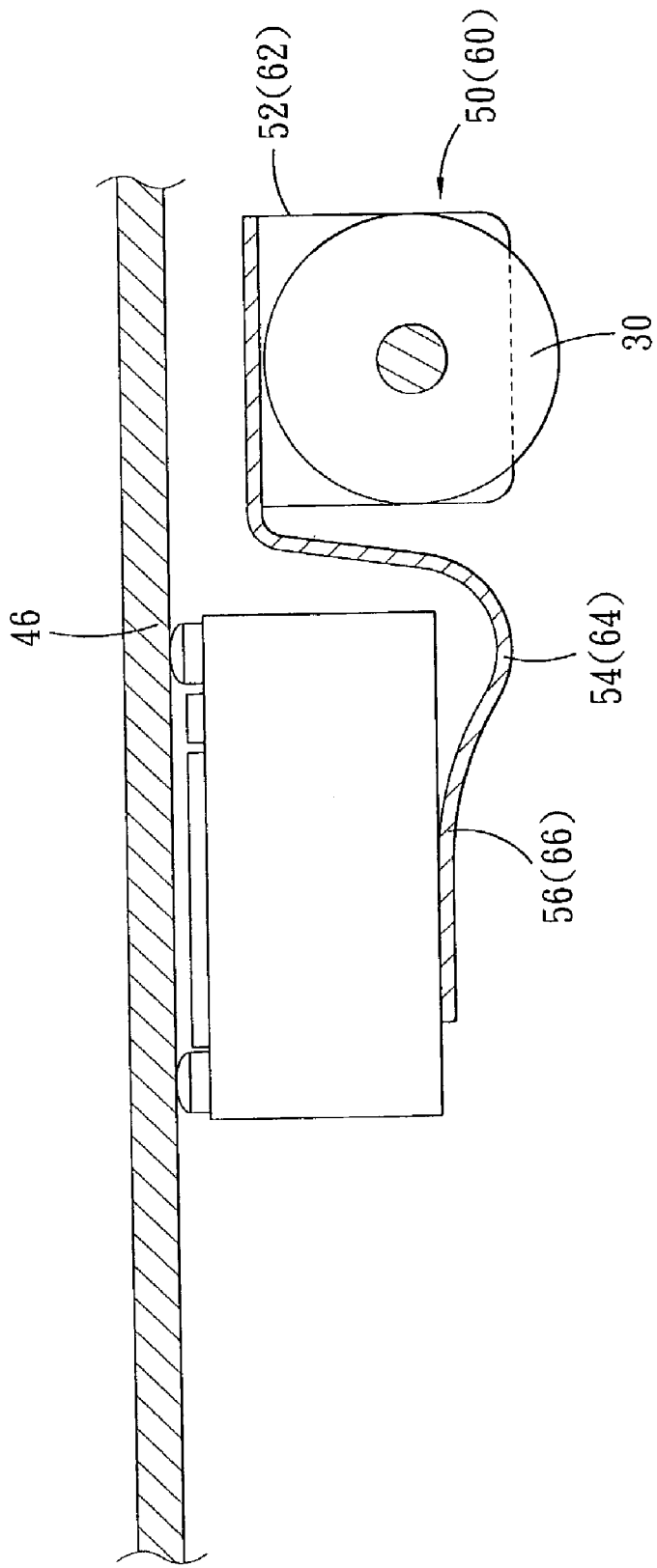
FIG. 7 is a schematically cross-sectional view showing the carrying seat according to another embodiment of the invention.

As shown in FIG. 7, the bottom faces 54 and 64 of the receiving recess 22 of the two carrying seats 50 and 60 are formed with a protrusion 56 and a protrusion 66, respectively. Thus, the elastic deformation of the protrusions 56 and 66 absorbs the downward displacement of the optical module 10 pressed by the glass window 46. Then, the optical module 10 is rested on the glass window 46 smoothly, and may be moved along the glass window 46.

While the embodiments of the invention have been shown and described, it will be apparent to those skilled in the art that various modifications may be made in the embodiments without departing from the spirit of the invention. Such modifications are all within the scope of the invention.

What is claimed is:

1. A combination of an optical module and a transmitting and carrying structure, comprising:
    an optical module having a scanning face, a bottom face opposite to the scanning face, and a first side and an opposite second side located between the scanning face and the bottom face, the first side and the opposite second side being perpendicular to a movement direction of the optical module;
    a carrying seat having two opposite roller seats, the carrying seat being mounted to the bottom face of the optical module, the two opposite roller seats being located at the first side and the second side of the optical module, respectively; and
    two rollers mounted to the two opposite roller seats of the carrying seat, respectively, and a topmost location of each roller being located between the scanning face and the bottommost face of the carrying seat.

2. The combination of an optical module and a transmitting and carrying structure according to claim 1, wherein the two opposite roller seats of the carrying seat are located at the same line parallel to the movement direction of the optical module.

3. The combination of an optical module and a transmitting and carrying structure according to claim 1, wherein the two opposite roller seats of the carrying seat are arranged in a staggered manner and are parallel with each other.

4. The combination of an optical module and a transmitting and carrying structure according to claim 1, wherein the carrying seat is formed with a receiving recess for receiving the optical module.

5. The combination of an optical module and a transmitting and carrying structure according to claim 4, wherein the carrying seat is formed with a receiving recess which has a planar bottom face.

6. The combination of an optical module and a transmitting and carrying structure according to claim 4, wherein the carrying seat is formed with a receiving recess which has a bottom face formed with a protrusion.

7. A combination of an optical module and a transmitting and carrying structure, comprising:
    an optical module having a scanning face, a bottom face opposite to the scanning face, and a first side and an opposite second side located between the scanning face and the bottom face, the first side and the opposite second side being perpendicular to a movement direction of the optical module;
    two carrying seats each provided with a roller seat, each carrying seat being mounted to the bottom face of the optical module, the roller seat of one carrying seat being located at the first side of the optical module, and the roller seat of the other carrying seat being located at the second side of the optical module; and
    two rollers mounted to the roller seats of the two carrying seats, respectively, and a topmost location of each roller being located between the scanning face and the bottommost face of the carrying seat.

8. The combination of an optical module and a transmitting and carrying structure according to claim 7, wherein the two opposite roller seats of the two carrying seats are located at the same line parallel to the movement direction of the optical module.

9. The combination of an optical module and a transmitting and carrying structure according to claim 7, wherein the two opposite roller seats of the two carrying seats are arranged in a staggered manner and are parallel with each other.

10. The combination of an optical module and a transmitting and carrying structure according to claim 7, wherein each of the two carrying seats has a planar bottom face.

11. The combination of an optical module and a transmitting and carrying structure according to claim 7, wherein each of the two carrying seats has a bottom face formed with a protrusion.

* * * * *